(12) United States Patent
Nicodemus et al.

(10) Patent No.: US 11,994,855 B2
(45) Date of Patent: May 28, 2024

(54) METHOD FOR CONTROLLING A MOTOR VEHICLE REMOTELY

(71) Applicant: Robert Bosch GmbH, Stuttgart (DE)

(72) Inventors: Rolf Nicodemus, Bietigheim-Bissingen (DE); Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 507 days.

(21) Appl. No.: 17/009,697

(22) Filed: Sep. 1, 2020

(65) Prior Publication Data

US 2021/0089025 A1 Mar. 25, 2021

(30) Foreign Application Priority Data

Sep. 23, 2019 (DE) .......................... 102019214423.3

(51) Int. Cl.
*G05D 1/00* (2024.01)
*B60W 40/02* (2006.01)

(52) U.S. Cl.
CPC .................................. *G05D 1/0022* (2013.01)

(58) Field of Classification Search
CPC ......... G05D 1/0022; G05D 2201/0213; G05D 1/0011; B60W 40/02
See application file for complete search history.

(56) References Cited

U.S. PATENT DOCUMENTS

| 2011/0056185 A1* | 3/2011 | Bradley | .................... F01N 3/00 60/285 |
| 2014/0094998 A1* | 4/2014 | Cooper | ............... B61L 15/0036 701/2 |
| 2014/0316633 A1* | 10/2014 | Tsujimoto | ............ G05D 1/0223 701/23 |
| 2018/0307251 A1* | 10/2018 | Harvey | ................ G05D 1/0022 |

FOREIGN PATENT DOCUMENTS

| DE | 102007053406 B3 | 6/2009 |
| DE | 102010003502 A1 | 10/2011 |
| DE | 102014006319 A1 | 11/2015 |
| DE | 102015014150 A1 | 11/2016 |
| DE | 102016104996 A1 | 9/2017 |
| DE | 102017200842 A1 | 7/2018 |
| DE | 102018130757 A1 | 6/2020 |

OTHER PUBLICATIONS

Translation DE10201501415A1 (Year: 2015).*
Translation DE102018130757A1 (Year: 2018).*
Translation DE102016104996A1 (Year: 2016).*

* cited by examiner

*Primary Examiner* — Frederick M Brushaber
(74) *Attorney, Agent, or Firm* — NORTON ROSE FULBRIGHT US LLP; Gerard A. Messina

(57) ABSTRACT

A method for controlling a motor vehicle remotely. The method includes: receiving motor vehicle setting signals, which represent a setting of a motor vehicle that intends to travel into a restricted geographic region; receiving entry condition signals, which represent an entry condition that must be satisfied, so that a motor vehicle may travel into the (Continued)

region; based upon the motor vehicle setting, checking if the entry condition for the motor vehicle is satisfied; generating remote control signals for controlling the motor vehicle remotely, based on a result of the check as to whether the entry condition is satisfied; and outputting the generated remote control signals. A device, a computer program and a machine-readable storage medium are also provided.

18 Claims, 1 Drawing Sheet

METHOD FOR CONTROLLING A MOTOR VEHICLE REMOTELY

CROSS REFERENCE

The present application claims the benefit under 35 U.S.C. § 119 of German Patent Application No. DE 102019214423.3 filed on Sep. 23, 2019, which is expressly incorporated herein by reference in its entirety.

FIELD

The present invention relates to a method for controlling a motor vehicle remotely. In addition, the present invention relates to a device, a computer program and a machine-readable storage medium.

BACKGROUND INFORMATION

Currently, there are legal requirements that, under certain circumstances, motor vehicles are no longer allowed to travel into a city or into a particular area of a city. For example, emissions requirements are one reason.

Such a ban is implemented, for example, by signs, which signal that entry into a certain area or into the city is prohibited for a motor vehicle. In some instances, there may be police checks that monitor the ban.

German Patent No. DE 10 2007 053 406 B3 describes a method and a device for carrying out an adaptation and a diagnosis in the case of control devices in a vehicle that are relevant to emissions.

German Patent Application No. DE 10 2010 003 502 A1 describes a method for operating a vehicle operable without emissions.

German Patent Application No. DE 10 2014 006 319 A1 describes a system for assessing and/or optimizing the operational performance of a vehicle.

SUMMARY

The object of the present invention is to provide an efficient way which allows one to efficiently check or control whether a motor vehicle may travel into a restricted geographic region, for which an entry condition is in force.

This object may be achieved with the aid of example embodiments of the present invention. Advantageous refinements of the present invention are described herein.

According to a first aspect of the present invention, an example method for controlling a motor vehicle remotely is provided, including the following steps:

receiving motor vehicle setting signals, which represent a setting of a motor vehicle that intends to travel into a restricted geographic region;

receiving entry condition signals, which represent an entry condition that must be satisfied, so that a motor vehicle may travel into the region;

based upon the motor vehicle setting, checking if the entry condition for the motor vehicle is satisfied;

generating remote control signals for controlling the motor vehicle remotely, based on a result of the check as to whether the entry condition is satisfied; and outputting the generated remote control signals.

According to a second aspect of the present invention, an example device is provided, which is configured to execute all of the steps of the method according to the first aspect.

According to a third aspect of the present invention, an example computer program is provided, which includes commands that, in response to the execution of the computer program by a computer, for example, by the device according to the second aspect, cause it to implement a method according to the first aspect.

According to a fourth aspect of the present invention, an example machine-readable storage medium is provided, in which the computer program according to the third aspect is stored.

In accordance with an example embodiment of the present invention, in response to a motor vehicle setting, which results in the entry condition for the motor vehicle not being satisfied, the above-mentioned object may be achieved by assuming remote control over the motor vehicle, in particular, even while the motor vehicle is moving. Thus, this means, in particular, that the motor vehicle is checked or controlled remotely, if the entry condition for the vehicle is not satisfied.

This may produce, for example, the technical advantage that one may efficiently check or control whether or not the motor vehicle is traveling into the area. In this manner, in particular, the motor vehicle may be efficiently prevented from entering the area.

Consequently, this produces, in particular, the technical advantage that a way is provided, to efficiently allow control to be exercised remotely over the travel of motor vehicles into a restricted geographic region, for which an entry condition is in force.

According to one specific embodiment of the present invention, the remote control signals include control signals for controlling a lateral and/or longitudinal guidance of the motor vehicle, in order to control the lateral and/or longitudinal guidance of the motor vehicle remotely during remote control of the motor vehicle on the basis of the remote control signals.

According to one specific embodiment of the present invention, the remote control signals include control signals for controlling a lateral and/or longitudinal guidance of the motor vehicle, in order to control the lateral and longitudinal guidance of the motor vehicle remotely during remote control of the motor vehicle on the basis of the remote control signals.

This may produce, for example, a technical advantage that the motor vehicle may be controlled remotely in an efficient manner. In particular, this produces the technical advantage that the motor vehicle may be checked remotely in an efficient manner.

In the case in which the remote control signals include control signals for controlling the lateral or the longitudinal guidance of the motor vehicle, one specific embodiment of the present invention provides that in each instance, the other guidance, that is, the longitudinal guidance or the lateral guidance, be either controlled manually by the driver (which may then be referred to, in particular, as assisted driving), or controlled in an at least semiautomated manner, in order to drive the motor vehicle in an at least semiautomated manner.

Assisted driving means, in particular, that a driver of the motor vehicle permanently carries out either the lateral or the longitudinal guidance of the motor vehicle. The other respective driving task (that is, controlling the longitudinal or the lateral guidance of the motor vehicle) is carried out remotely in an automatic manner. Therefore, this means that in the case of assisted driving of the motor vehicle, either the lateral or the longitudinal guidance is controlled remotely in an automatic manner.

The wording "at least semiautomated driving" includes one or more of the following cases: semiautomated driving, highly automated driving, fully automated driving.

Semiautomated driving means that in a specific situation (for example: driving on an expressway, driving within a parking lot, passing an object, driving within a traffic lane, which is defined by lane markings) and/or for a certain period of time, longitudinal and lateral guidance of the motor vehicle are controlled remotely in an automatic manner. A driver of the motor vehicle does not have to manually control the longitudinal and lateral guidance of the motor vehicle himself/herself. However, the driver must monitor the automatic, remote control of the longitudinal and lateral guidance continuously, in order to be able to manually intervene, if necessary. The driver must be ready to completely take over the driving of the motor vehicle at any time.

Highly automated driving means that for a certain period of time in a specific situation (for example: driving on an expressway, driving within a parking lot, passing an object, driving within a traffic lane, which is defined by lane markings), longitudinal and lateral guidance of the motor vehicle are controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance continuously, in order to be able to intervene manually, as required. If necessary, a take-over request to the driver for assuming the control of the longitudinal and lateral guidance is output automatically, in particular, outputted with adequate time to spare. Thus, the driver must be potentially able to take over the control of the longitudinal and lateral guidance. Limits of the automatic, remote control of the lateral and longitudinal guidance are detected automatically. In the case of highly automated driving, it is not possible to bring about a minimum-risk state automatically in every initial situation.

Fully automated driving means that in a specific situation (for example: driving on an expressway, driving within a parking lot, passing an object, driving within a traffic lane, which is defined by lane markings), longitudinal and lateral guidance of the motor vehicle is controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance, in order to be able to intervene manually, when necessary. Prior to an end of the automatic, remote control of the lateral and longitudinal guidance, a request for the driver to take over the driving task (controlling the lateral and longitudinal guidance of the motor vehicle) is made automatically, in particular, with adequate time to spare. If the driver does not assume the driving task, then a return is made automatically to a minimum-risk state. Limits of the automatic control of the lateral and longitudinal guidance are detected automatically. In all situations, it is possible to return automatically to a minimum-risk system state.

According to one specific embodiment of the present invention, if the result indicates that the entry condition is not satisfied, the control signals are generated in such a manner, that in the case of the remote control of the lateral and/or longitudinal guidance of the motor vehicle on the basis of the generated remote control signals, the motor vehicle does not travel into the region or does travel into the region and stops in a predetermined area inside of the region.

This may produce, for example, the technical advantage that the motor vehicle may be efficiently prevented from traveling into the region. In particular, this provides the technical advantage that it may be efficiently ensured, that the motor vehicle only travels up to the predetermined area within the region.

According to one specific embodiment of the present invention, if the result indicates that the entry condition is not satisfied, then, on the basis of the entry condition and the motor vehicle setting, an adapted motor vehicle setting is ascertained in such a manner, that based on the adapted motor vehicle setting, a check as to whether the entry condition is satisfied, reveals that the entry condition is satisfied; the remote control signals including adaptation signals, which represent the adapted motor vehicle setting, in order to remotely adapt the setting of the motor vehicle on the basis of the adapted motor vehicle setting.

This may produce, for example, the technical advantage that the motor vehicle setting may be adjusted remotely in an efficient manner. This produces, in particular, the technical advantage that the motor vehicle is shifted into a state, in which the motor vehicle satisfies the entry condition on the basis of the adapted motor vehicle setting. Thus, for example, the motor vehicle may then travel into the region. Therefore, this means, in particular, that after the motor vehicle setting is adapted, entry for the motor vehicle into the region is enabled on the basis of the adapted motor vehicle setting.

In one specific embodiment of the present invention, in the case of prevention of the adaptation of the motor vehicle setting, or in the case of unauthorized reverse adaptation (that is, in the case of unauthorized cancellation) of the adapted motor vehicle setting, the remote control signals then include the control signals for controlling the lateral and/or longitudinal guidance of the motor vehicle.

According to one specific embodiment of the present invention, surrounding-area signals are received, which represent a surrounding area of the motor vehicle; the remote control signals, in particular, the control signals, being generated on the basis of the surrounding area.

This may produce, for example, the technical advantage that the remote control signals, in particular, the control signals, may be generated efficiently. In particular, this produces the technical advantage that a surrounding area of the motor vehicle may be taken into account efficiently during the generation of the remote control signals, in particular, of the control signals.

According to one specific embodiment of the present invention, it is checked, on the basis of the surrounding area of the motor vehicle, if a current traffic situation permits remote control of the motor vehicle. In particular, the control signals are generated or outputted on the basis of a result of the check as to whether the current traffic situation permits remote control.

For example, remote control of the motor vehicle is refrained from, if the current traffic situation does not permit remote control.

This may produce, for example, the technical advantage that other road users in the surroundings of the motor vehicle are not put at risk or injured.

According to one specific embodiment of the present invention, safety condition signals are received, which represent at least one safety condition that must be satisfied, so that the motor vehicle may be controlled remotely; it being checked if the at least one safety condition is satisfied; the remote control signals being generated on the basis of a result of the check as to whether the at least one safety condition is satisfied.

This may produce, for example, the technical advantage that the remote control signals may be generated efficiently. In particular, this produces the technical advantage that it may be ensured, in an efficient manner, that certain conditions, presently, the safety condition, are satisfied for controlling the motor vehicle remotely. Consequently, in particular, the technical advantage is produced, that if the safety condition is met, the remote control of the motor vehicle is then safely possible.

According to one specific embodiment of the present invention, it is provided that the at least one safety condition be, in each instance, an element selected from the following group of safety conditions: presence of a predetermined safety integrity level (SIL) or automotive safety integrity level (ASIL) of at least the motor vehicle and an infrastructure, in particular, including a communication path and/or communications components (for example, a communications interface), for controlling a motor vehicle remotely (in particular, with regard to the overall systems in the motor vehicle and infrastructure, as well as, in particular, parts, e.g., components, algorithms, interfaces, etc.; presence of a maximum latency time of a communication between the motor vehicle and a remote control device for controlling the motor vehicle remotely on the basis of the remote control signals; presence of a predetermined computer protection level of a device for executing the steps of the example method according to the first aspect of the present invention; presence of predetermined components and/or algorithms and/or communication options, which are used for executing the steps of the example method according to the first aspect of the present invention; presence of redundancy and/or diversity in predetermined components and/or algorithms and/or communication options, which are used for executing the steps of the example method according to the first aspect of the present invention; presence of predetermined availability information, which indicates an availability of predetermined components and/or algorithms and/or communication options; presence of predetermined quality criteria of the predetermined components and/or algorithms and/or communication options; presence of a plan, which includes measures for reducing faults, and/or measures in response to failures of predetermined components and/or algorithms and/or communication options, and/or measures for incorrect analyses and/or measures in response to incorrect interpretations; presence of one or more fallback scenarios; presence of a predetermined function; presence of a predetermined traffic situation; presence of predetermined weather, maximum possible time for a specific performance or execution of one step or a plurality of steps of the method according to the first aspect; presence of a test result, that elements or functions, which are used for executing the method according to the first aspect, are presently functioning correctly.

A communication path is, for example, a communication path between the device according to the second aspect, and the motor vehicle. A communication path includes, for example, one or more communication channels.

In one specific embodiment of the present invention, a component, which is used for executing the example method according to the first aspect of the present invention, is an element selected from the following group of components: surround sensor, motor vehicle, infrastructure, remote control device, device according to the second aspect, motor vehicle system, in particular, drive system, clutch system, brake system, driver assistance system, communications interface of the motor vehicle or of the infrastructure, processor, input, output of the device according to the second aspect.

In one specific embodiment of the present invention, a function, which is used for executing the method according to the first aspect of the present invention, is an element selected from the following group of functions: remote control function, communication function between the motor vehicle and the infrastructure or the remote control device, evaluation function of surround sensor data of a surround sensor, planning function, in particular, travel planning function, traffic analysis function, emissions analysis function.

The following determines, in particular, a computer protection level: activated firewall and/or valid encryption certificate for encryption of a communication between the motor vehicle and the infrastructure or the remote control device, and/or activated virus program including current virus signatures, and/or presence of a protection, in particular, mechanical protection, in particular, anti-intrusion protection, of the computer, in particular, of the device according to the second aspect, or of the remote control device, and/or presence of an option for checking that signals, in particular, remote control signals or surrounding-area signals, have been transmitted correctly, that is, error-free.

An algorithm includes, for example, the computer program according to the third aspect of the present invention.

Since, in particular, it is checked that redundancy and/or diversity is present in predetermined components and/or algorithms and/or communication options, for example, the technical advantage is provided, that in the case of failure of the corresponding component, for example, a computer, or the corresponding algorithm or the corresponding communication option, nevertheless, safe functioning may be implemented.

In order to ensure that results are correct, according to one specific embodiment of the present invention, these may be computed several times, for example, and the corresponding results may be compared to each other. For example, it is only determined that the results are correct, if the results agree. If an odd number occurs several times, it may then be determined, for example, that the result corresponding to the highest number of equal results is correct.

For example, remote control signals are only generated, when it is able to be determined that the result is correct.

In one specific embodiment of the present invention, the remote control signals are generated only if the at least one safety condition is satisfied.

In one specific embodiment of the present invention, the check as to whether the at least one safety condition is satisfied, is carried out prior to and/or after and/or during one or more predetermined method steps.

In particular, this produces the technical advantage that it may be ensured in an efficient manner, that certain conditions, presently, the safety condition, are satisfied for controlling the motor vehicle remotely prior to and/or after and/or during the execution of the corresponding method steps. Consequently, in particular, the technical advantage is produced, that if the safety condition is met, the remote control of the motor vehicle is then safely possible.

In one specific embodiment of the present invention, it is provided that after the outputting of the remote control signals, remote control of the motor vehicle is checked on the basis of the outputted remote control signals, in order to detect a fault; in response to the detection of a fault, the remote control is interrupted, or emergency remote control signals for controlling the motor vehicle remotely in an emergency are generated and outputted.

According to one specific embodiment of the present invention, the emergency remote control signals include emergency control signals for controlling the lateral and/or longitudinal guidance of the motor vehicle remotely. The emergency control signals are, for example, such, that in the case of the remote control of the lateral and/or longitudinal guidance of the motor vehicle on the basis of the emergency control signals, the motor vehicle is carried over into a safe state, in particular, stopped.

Variants, which are made in connection with the remote control signals, in particular, with the control signals, apply analogously to the emergency remote control signals, in particular, the emergency control signals, and vice versa.

According to one specific embodiment of the present invention, the entry condition specifies a maximum limiting pollutant emissions value, which pollutant emissions of a motor vehicle may not exceed, in order for the motor vehicle to be allowed to travel into the region; the checking as to whether the entry condition is satisfied, including a check as to whether pollutant emissions of the motor vehicle exceed the maximum limiting pollutant emissions value.

This may produce, for example, the technical advantage that only motor vehicles, whose pollutant emissions do not exceed the maximum limiting pollutant emissions value, may travel into the region.

According to one specific embodiment of the present invention, the pollutant emissions of the motor vehicle are ascertained, for example, on the basis of the motor vehicle setting and/or from a database. The ascertainment of the pollutant emissions may include, in particular, an estimate of the pollutant emissions.

For example, the maximum limiting pollutant emissions value may be zero. Therefore, this means, in particular, that for the region, motor vehicles are permitted to have zero pollutant emissions within the region. As a rule, this may only be implemented by motor vehicles, which include an electric drive; for the implementation, the motor vehicle only being powered by the electric drive. In particular, an internal combustion engine of the motor vehicle is switched off, in this case, switched off remotely, before the motor vehicle travels into the region.

According to one specific embodiment of the present invention, the motor vehicle setting includes one or more of the elements selected from the following group of motor vehicle setting parameters: internal combustion engine setting, in particular, injection parameters, of an internal combustion engine of the motor vehicle; operating state of an electric motor of the motor vehicle.

This may produce, for example, the technical advantage that particularly suitable motor vehicle setting parameters are used.

One operating state of an electric motor indicates, for example, if the electric motor is switched on or switched off. The operating state of an electric motor of the motor vehicle indicates, for example, whether or not the electric motor is propelling the motor vehicle.

According to one specific embodiment of the present invention, if the result indicates that the entry condition is not satisfied, then, on the basis of the entry condition, an operational restriction for limiting an operation of the motor vehicle is ascertained in such a manner, that based on the operational restriction, a check as to whether the entry condition is satisfied, reveals that the entry condition is satisfied; the remote control signals including restriction signals, which represent the operational restriction, in order to restrict the operation of the motor vehicle remotely on the basis of the operational restriction.

This produces, for example, the technical advantage that the operation of the motor vehicle may be restricted remotely in an efficient manner.

In particular, this produces the technical advantage that after the operational restriction, the motor vehicle satisfies the entry condition, which means that entry for the motor vehicle into the region may subsequently be enabled.

According to one specific embodiment of the present invention, the operational restriction specifies a maximum motor vehicle speed and/or a maximum motor vehicle acceleration.

This produces, for example, the technical advantage that the pollutant emissions of the motor vehicle may be limited in an efficient manner, since as a rule, a lower motor vehicle speed and a lower motor vehicle acceleration also produce lower pollutant emissions of the motor vehicle in an efficient manner.

According to one specific embodiment of the present invention, one or more method steps up to the steps of generating and outputting the remote control signals are executed in the motor vehicle, and/or one or more method steps are executed outside of the motor vehicle, in particular, in an infrastructure, preferably, in a cloud infrastructure.

This may produce, for example, the technical advantage that the corresponding method steps may be carried out in an efficiently redundant manner. In particular, this may further increase safety in an advantageous manner.

According to one specific embodiment of the present invention, one or more method steps are documented, in particular, documented in a blockchain.

The technical advantage of this is, for example, that on the basis of the documentation, this may also be analyzed subsequently after the performance or execution of the method. In particular, the documentation in a blockchain has the technical advantage that the documentation is safe from manipulation and falsification.

A blockchain (also block chain) is, in particular, a continuously expandable list of data records, called blocks, which are linked together with the aid of one or more cryptographic methods. In this context, each block contains, in particular, a cryptographically secure hash (standard value of deviation) of the preceding block, in particular, a time stamp and, in particular, transactional data.

According to one specific embodiment of the present invention, it is provided that the method according to the first aspect be a computer-implemented method.

According to one specific embodiment of the present invention, the example method according to the first aspect is executed or performed with the aid of the device according to the second aspect.

Device features follow analogously from corresponding method features, and vice versa. Thus, this means that, in particular, technical functions of the device according to the second aspect follow analogously from corresponding instances of technical functionality of the method according to the first aspect, and vice versa.

The wording "at least one" stands, in particular, for "one or more."

Exemplary embodiments of the present invention are represented in the figures and explained in greater detail below.

DETAILED DESCRIPTION OF EXAMPLE EMBODIMENTS

Figure 1:
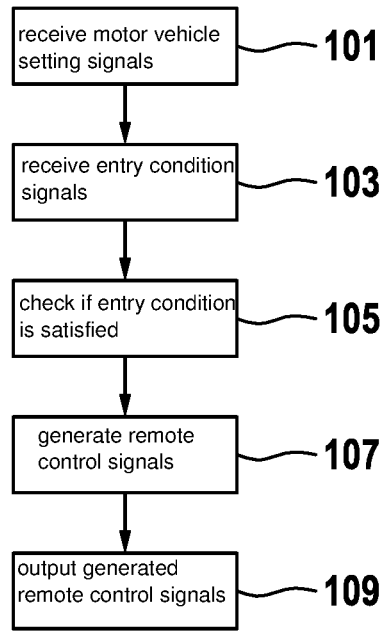
FIG. 1 shows a flow chart of an method for controlling a motor vehicle remotely according to an example embodiment of the present invention.

FIG. 1 shows a flow chart of an example method for controlling a motor vehicle remotely in accordance with the present invention, including the following steps:

receiving 101 motor vehicle setting signals, which represent a setting of a motor vehicle that intends to travel into a restricted geographic region;

receiving 103 entry condition signals, which represent an entry condition that must be satisfied, so that a motor vehicle may travel into the region;

based upon the motor vehicle setting, checking 105 if the entry condition for the motor vehicle is satisfied;

generating 107 remote control signals for controlling the motor vehicle remotely, based on a result of the check as to whether the entry condition is satisfied; and outputting 109 the remote control signals generated.

The result of the check 105 indicates, for example, that the entry condition is satisfied or is not satisfied.

In one specific example embodiment of the present invention, the remote control signals are only generated, if the result indicates that the entry condition is not satisfied.

In one specific example embodiment of the present invention, it is provided that the remote control signals only be generated, if the result indicates that the entry condition is not satisfied, and if the at least one safety condition is satisfied.

According to one specific example embodiment of the present invention, upon arrival of the motor vehicle at a boundary of the geographic region, the step of checking, based on the motor vehicle setting, if the entry condition for the motor vehicle is satisfied, is executed.

Thus, this means, in particular, that in response to arrival at the regional boundary or boundary of the region, the checking step is executed.

If a result of the check as to whether the entry condition for the motor vehicle is satisfied, indicates that the entry condition for the motor vehicle is not satisfied, one or more actions are executed, in particular, an intervention is made in the operation of the motor vehicle. In general, the motor vehicle is, in particular, controlled remotely.

According to one specific example embodiment, boundary vicinity signals are received, which represent a vicinity of a boundary of the geographic region.

According to one specific example embodiment, the boundary vicinity signals are processed, in order to detect an arriving motor vehicle, which intends to travel into the geographic region.

According to one specific example embodiment, the step of checking if the entry condition for the motor vehicle is satisfied, is executed in response to detection of an arriving motor vehicle. According to one specific example embodiment, in response to detection of an arriving motor vehicle, which intends to travel into the geographic region, the step(s) of receiving motor vehicle setting signals and/or entry condition signals is (are) executed.

According to one specific example embodiment, position signals are received, which represent a position of a motor vehicle that intends to travel into the geographic region.

According to one specific example embodiment, in response to detection of an arriving motor vehicle, which intends to travel into the geographic region, the step(s) of receiving motor vehicle setting signals and/or entry condition signals is (are) executed.

According to one specific example embodiment, position signals are received, which represent a position of a motor vehicle that intends to travel into the geographic region.

For example, the motor vehicle emits the position signals. In this manner, for example, the motor vehicle may be detected efficiently in an advantageous manner.

Figure 2:
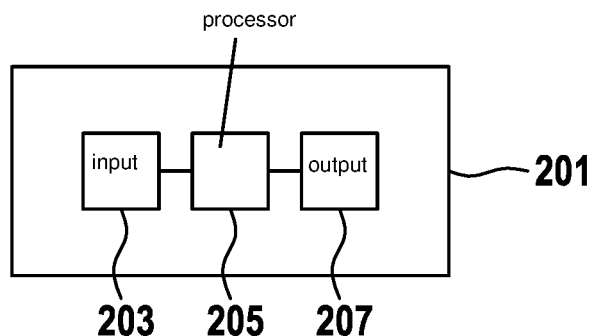
FIG. 2 shows a device according to an example embodiment of the present invention.

FIG. 2 shows an example device 201 according to the present invention.

Device 201 is configured to execute all of the steps of the method according to the first aspect.

Device 201 includes an input 203, which is configured to receive the motor vehicle setting signals and the entry condition signals.

Device 201 further includes a processor 205, which is configured to check, based on the motor vehicle setting, if the entry condition for the motor vehicle is satisfied. Processor 205 is further configured to generate remote control signals for controlling the motor vehicle remotely, based on a result of the check as to whether the entry condition is satisfied.

Device 201 further includes an output 207, which is configured to output the remote control signals generated.

According to one specific embodiment of the example embodiment, for example, outputting the generated remote control signals includes transmitting the remote control signals over a communications network, in particular, over a wireless communications network, to the motor vehicle.

According to one specific embodiment of the present invention, the method according to the first aspect includes controlling the motor vehicle remotely on the basis of the generated remote control signals.

In general, signals, which are received, are received with the aid of input 203. Thus, input 203 is configured, in particular, to receive the corresponding signals.

In general, signals, which are outputted, are outputted with the aid of output 207. Thus, output 207 is configured, in particular, to output the corresponding signals.

According to one specific embodiment of the present invention, a plurality of processors are provided in place of the one processor 205.

According to one specific embodiment of the present invention, processor 205 is configured to execute the generating and checking steps described above and/or in the following.

In one specific embodiment of the present invention, one or more method steps up to the steps of generating and outputting the remote control signals are executed inside the motor vehicle, and/or one or more method steps are executed outside of the motor vehicle, in particular, in an infrastructure, preferably, in a cloud infrastructure.

Device 201 is, for example, part of an infrastructure, in particular, cloud infrastructure, or part of the motor vehicle.

According to one specific embodiment of the present invention, for redundant execution of the corresponding method steps, a plurality of devices 201 may be provided, so that, for example, both the motor vehicle and the infrastructure, in particular, the cloud infrastructure, include a device 201.

Figure 3:
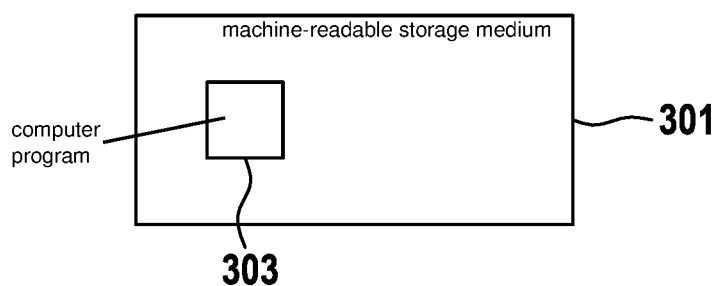
FIG. 3 shows a machine-readable storage medium in accordance with an example embodiment of the present invention.

FIG. 3 shows a machine-readable storage medium 301.

A computer program 303 is stored in machine-readable storage medium 301; the computer program including commands, which, in response to execution of computer program 303 by a computer, cause it to implement a method according to the first aspect.

According to one specific embodiment of the present invention, device 201 includes a remote control device, which is configured to control the motor vehicle remotely on the basis of the remote control signals generated.

According to one specific embodiment of the present invention, an infrastructure or an infrastructure system is provided, which includes, for example, the device according to the second aspect.

For example, the infrastructure monitors the geographic region, in particular, for motor vehicles, which intend to travel into the geographic region. For this monitoring, according to one specific embodiment, one or more surround sensors are provided, which are positioned so as to be spatially distributed on the boundary of the geographic region.

For example, a surround sensor is one of the following surround sensors: radar sensor, lidar sensor, video sensor, ultrasonic sensor, magnetic field sensor and infrared sensor.

According to one specific embodiment of the present invention, the infrastructure system is an emissions infrastructure system. Such a system monitors, in particular, compliance with emissions limiting requirements inside the geographic region.

An illustrative scenario, in which the present invention described here is used, is described in the following.

According to one specific embodiment of the present invention, a motor vehicle approaches a boundary of a restricted geographic region, for which there is an entry condition. Therefore, this means that in order for a motor vehicle to be allowed to travel into the region, the entry condition for the motor vehicle must be satisfied.

According to one specific embodiment of the present invention, the motor vehicle is connected to the infrastructure, in particular, to the emissions infrastructure system, so as to be able to communicate; or, in front of the region, it is connected, in particular, automatically, to the system or the infrastructure, in particular, so as to be able to communicate automatically.

According to one specific embodiment of the present invention, the motor vehicle emits a signal, in particular, a position signal, and may be detected in this manner.

According to one specific embodiment of the present invention, the motor vehicle is detected, in particular, by the infrastructure, using, for example, visual methods, such as license plate detection.

According to one specific embodiment of the present invention, the requirements (entry condition) and the motor vehicle or a setting of the motor vehicle are analyzed, in particular, by the infrastructure.

For this, e.g., the motor vehicle setting may be transmitted by the motor vehicle and/or retrieved by the motor vehicle.

Therefore, this means, in particular, that request signals, which represent a request to the motor vehicle for the motor vehicle setting, are generated and outputted.

According to one specific embodiment of the present invention, the motor vehicle settings are compared to data from a cloud system, in order to prevent improper use. Data from the cloud system, which may also be referred to as a cloud infrastructure, include, for example, data of the motor vehicle and/or the motor vehicle settings, which may be adjusted and/or adapted.

According to one specific embodiment of the present invention, it is checked if the entry condition for the motor vehicle is satisfied; the check being carried out or executed on the basis of the motor vehicle setting.

According to one specific embodiment of the present invention, if a result of the check indicates that the entry condition is not satisfied, then one or more of the following actions are carried out or executed:

According to one specific embodiment of the present invention, the motor vehicle setting is changed in such a manner, that it matches the entry condition. In other words, according to one specific embodiment, the motor vehicle setting is adapted in such a manner, that based on the adapted motor vehicle setting, the check as to whether the entry condition is satisfied, reveals that the entry condition is satisfied.

The adaptation or changing of the motor vehicle setting includes, for example, that a hybrid motor vehicle is shifted to pure electric drive.

According to one specific embodiment of the present invention, the adapting or changing includes, that an internal combustion engine setting of an internal combustion engine of the motor vehicle is adjusted or adapted in such a manner, that it only still permits certain pollutant emissions or ones that conform to requirements, that is, satisfy the entry condition. For example, injection parameters are adjusted. For example, a maximum speed is specified for the motor vehicle. For example, a maximum acceleration is specified for the motor vehicle.

According to one specific embodiment of the present invention, such an action includes preventing the motor vehicle from entering the region. This is brought about, in particular, by generating and outputting appropriate control signals for controlling a lateral and longitudinal guidance of the motor vehicle in an at least semiautomated manner.

For example, the motor vehicle is only permitted to travel to a parking lot or lateral area inside of the region. This is brought about, in particular, by generating and outputting appropriate control signals for controlling the lateral and longitudinal guidance of the motor vehicle in an at least semiautomated manner.

According to one specific embodiment of the present invention, it is tested if a current traffic situation permits an intervention, that is, in particular, remote control, in order, for example, to prevent other road users in the surroundings of the motor vehicle from being injured.

According to one specific embodiment of the present invention, the operation, that is, the method, in other words, the method steps, are documented in a comprehensible manner safe from falsification, for example, in a blockchain.

According to one specific embodiment of the present invention, a driver of the motor vehicle is notified that an intervention in the operation of the motor vehicle has taken place or is taking place, that is, that the motor vehicle has been controlled remotely or is being controlled remotely.

Therefore, this means, in particular, that communication signals, which represent a corresponding communication, are generated and outputted. For example, the communication signals are outputted to a human-machine interface of the motor vehicle, which means that with the aid of the human-machine interface, the driver is informed about the intervention or the remote control on the basis of the communication signals.

According to one specific embodiment of the present invention, the intervention or the remote control of the motor vehicle is communicated to an authority, so that, for example, it may initiate further steps.

According to one specific embodiment of the present invention, a condition for the remote control or for the intervention is that the remote control is safe. In the spirit of the description, "safe" means, in particular, "safe" and "secure." Actually, these two English terms are normally translated into German as "sicker". Nevertheless, these have a partially different meaning in English.

The term "safe" is directed, in particular, to the topic of accident and accident prevention. Remote control, which is "safe," causes, in particular, a probability of an accident or a collision to be less than or less than or equal to a predetermined threshold probability value.

The term "secure" is directed, in particular, to the topic of computer protection and/or hacker protection, that is, in particular, how securely is an (a) (computer) infrastructure and/or a communications infrastructure, in particular, a communication path between a motor vehicle and a remote control device for controlling a motor vehicle remotely, protected from unauthorized access and/or from data manipulation by a third party (hacker).

Thus, remote control, which is "secure," has, in particular, appropriate and sufficient computer protection and/or hacker protection as a basis.

For example, according to one specific embodiment of the present invention, it is tested if the entity made up of a motor vehicle and infrastructure involved in the method according to the first aspect, including communication between the infrastructure and the motor vehicle, is currently secure for the plan, "intervention in the motor vehicle for critical actions," described here. Therefore, this means, in particular, that the motor vehicle and/or a local and/or a global infrastructure and/or communication are appropriately tested. In particular, the remote control signals are generated on the basis of a result of the testing.

Thus, this means, in particular, that the components, which are used during the execution of the method according to the first aspect, are tested for safety, that is, as to whether these satisfy specific safety conditions, before the intervention in the vehicle operation is carried out, that is, before the motor vehicle is controlled remotely.

Important or dependent criteria include, for example, one or more of the safety conditions described above.

According to one specific embodiment of the present invention, first of all, the overall system (motor vehicle, infrastructure, communication path, cloud, . . . ) is tested with regard to the safety condition.

According to one specific embodiment of the present invention, the individual parts are also tested with regard to satisfying the safety condition. This, in particular, prior to the remote control of the motor vehicle.

In this context, in one specific embodiment of the present invention, the testing step(s) are executed inside the motor vehicle and/or outside the motor vehicle, in particular, in an infrastructure.

According to one specific embodiment of the present invention, the checking step(s) are tested subsequently, that is, at a later time, for example, at regular intervals. For example, the testing step(s) are tested subsequently at a predetermined frequency, for example, every 100 ms.

For example, according to one specific embodiment of the present invention, this testing, that is, the test as to whether the at least one safety condition is satisfied, is carried out prior to and/or after and/or during one or more predetermined method steps.

According to one specific embodiment of the present invention, the testing is carried out or executed in response to problems.

What is claimed is:

1. A method for controlling a motor vehicle remotely, comprising the steps of:
receiving motor vehicle setting signals, which represent a setting of a motor vehicle that intends to travel into a restricted geographic region;
receiving entry condition signals, which represent an entry condition that must be satisfied, so that a motor vehicle may travel into the region;
based upon the motor vehicle setting, checking whether the entry condition for the motor vehicle is satisfied;
generating remote control signals for controlling the motor vehicle remotely, based on a result of the check as to whether the entry condition is satisfied; and
outputting the generated remote control signals,
wherein when the result of the check indicates that the entry condition is not satisfied, an adapted motor vehicle setting is ascertained, and the setting of the motor vehicle is remotely adapted based on the adapted motor vehicle setting such that the motor vehicle may travel into the region,
wherein the adapted motor vehicle setting includes at least one of: shifting a hybrid motor vehicle to pure electric drive, an internal combustion engine permitting only certain pollutant emissions, or a maximum speed or maximum acceleration specified for the motor vehicle,
wherein surrounding-area signals are received, which represent a surrounding area of the motor vehicle including a current traffic situation, and the remote control signals are generated based on the surrounding area.

2. The method as recited in claim 1, wherein the remote control signals include control signals for controlling a lateral and/or longitudinal guidance of the motor vehicle, to control the lateral and/or longitudinal guidance of the motor vehicle remotely during remote control of the motor vehicle based on the remote control signals.

3. The method as recited in claim 2, wherein when the result of the check indicates that the entry condition is not satisfied, the control signals are generated in such a manner, that in the case of the remote control of the lateral and/or longitudinal guidance of the motor vehicle based on the generated remote control signals, the motor vehicle does not travel into the region or does travel into the region and stops in a predetermined area inside of the region.

4. The method as recited in claim 1, wherein safety condition signals are received, which represent at least one safety condition that must be satisfied, so that the motor vehicle may be controlled remotely, it is checked if the at least one safety condition is satisfied, and the remote control signals are generated on based on a result of the check as to whether the at least one safety condition is satisfied.

5. The method as recited in claim 4, wherein the at least one safety condition is an element selected from the following groups of safety conditions: (i) presence of a predetermined safety integrity level or automotive safety integrity level of at least the motor vehicle and an infrastructure including a communication path and/or communications components, for controlling a motor vehicle remotely, (ii) presence of a maximum latency time of a communication between the motor vehicle and a remote control device for controlling the motor vehicle remotely based on the remote control signals, (iii) presence of a predetermined computer protection level of a device for executing the steps of the method according, (iv) presence of predetermined components and/or algorithms and/or communication options, which are used for executing the steps of the method, (v) presence of redundancy and/or diversity in predetermined components and/or algorithms and/or communication options, which are used for executing the steps of the method, (vi) presence of predetermined availability information, which indicates an availability of predetermined components and/or algorithms and/or communication options, (vii) presence of predetermined quality criteria of the predetermined components and/or algorithms and/or communication options, (viii) presence of a plan, which includes measures for reducing faults and/or measures in response to failures of predetermined components and/or algorithms and/or communication options and/or measures for incorrect analyses and/or measures in response to incorrect interpretations, (ix) presence of one or more fallback scenarios, (x) presence of a predetermined function; presence of a predetermined traffic situation, (xi) presence of predetermined weather, (xii) a maximum possible time for a specific performance or execution of one step or a plurality of steps of the method, (xiii) presence of a test result, that elements or functions, which are used for executing the method are presently functioning correctly.

6. The method as recited in claim 4, wherein the remote control signals are generated only when the at least one safety condition is satisfied.

7. The method as recited in claim 4, wherein the check as to whether the at least one safety condition is satisfied, is carried out at least one of prior to, after, or during one or more predetermined method steps.

8. The method as recited in claim 1, wherein after the outputting of the remote control signals, remote control of the motor vehicle is tested based on the output remote control signals, in order to detect a fault, and in response to the detection of the fault, the remote control is interrupted, or emergency remote control signals for controlling the motor vehicle remotely in an emergency are generated and outputted.

9. The method as recited in claim 1, wherein boundary vicinity signals are received, which represent a vicinity of a boundary of the geographic region, the boundary vicinity signals are processed, in order to detect an arriving motor vehicle, which intends to travel into the geographic region, and in response to detection of an arriving motor vehicle, at least one of the step of checking whether the entry condition for the motor vehicle is satisfied, is executed, or the step of receiving motor vehicle setting signals or entry condition signals are executed.

10. The method as recited in claim 1, further comprising:
testing whether an entity made up of the motor vehicle and infrastructure involved in the method, including communication between the infrastructure and the motor vehicle, is safe, so that the at least one motor vehicle, a local infrastructure, a global infrastructure, or communication between the motor vehicle and the infrastructure are tested accordingly.

11. The method as recited in claim 1, wherein the entry condition specifies a maximum limiting pollutant emissions value, which pollutant emissions of a motor vehicle may not exceed, in order for the motor vehicle to be allowed to travel into the region, and the checking as to whether the entry condition is satisfied includes a check as to whether pollutant emissions of the motor vehicle exceed the maximum limiting pollutant emissions value.

12. The method as recited in claim 1, wherein the motor vehicle setting includes one or more elements selected from the following group of motor vehicle setting parameters: an internal combustion engine setting of an internal combustion of the motor vehicle, injection parameters of the internal combustion engine of the motor vehicle, an operating state of an electric motor of the motor vehicle.

13. The method as recited in claim 1, wherein when the result indicates that the entry condition is not satisfied, then, based on the entry condition, an operational restriction for limiting an operation of the motor vehicle is ascertained in such a manner, that based on the operational restriction, a check as to whether the entry condition is satisfied, reveals that the entry condition is satisfied, wherein the remote control signals include restriction signals, which represent the operational restriction, in order to restrict the operation of the motor vehicle remotely based on the operational restriction.

14. The method as recited in claim 13, wherein the operational restriction specifies a maximum motor vehicle speed and/or a maximum motor vehicle acceleration.

15. The method as recited in claim 1, wherein one or more of the method steps up to the steps of generating and outputting the remote control signals are executed inside the motor vehicle, and/or one or more method steps are executed outside of the motor vehicle in a cloud infrastructure.

16. The method as recited in claim 1, wherein one or more method steps are documented in a blockchain.

17. A device configured to control a motor vehicle remotely, the device configured to:
receive motor vehicle setting signals, which represent a setting of a motor vehicle that intends to travel into a restricted geographic region;
receive entry condition signals, which represent an entry condition that must be satisfied, so that a motor vehicle may travel into the region;
based upon the motor vehicle setting, check whether the entry condition for the motor vehicle is satisfied;
generate remote control signals for controlling the motor vehicle remotely, based on a result of the check as to whether the entry condition is satisfied; and
output the generated remote control signals,
wherein when the result of the check indicates that the entry condition is not satisfied, an adapted motor vehicle setting is ascertained, and the setting of the motor vehicle is remotely adapted based on the adapted motor vehicle setting such that the motor vehicle may travel into the region,
wherein the adapted motor vehicle setting includes at least one of: shifting a hybrid motor vehicle to pure electric drive, an internal combustion engine permitting only certain pollutant emissions, or a maximum speed or maximum acceleration specified for the motor vehicle,
wherein surrounding-area signals are received, which represent a surrounding area of the motor vehicle including a current traffic situation, and the remote control signals are generated based on the surrounding area.

18. A non-transitory machine-readable storage medium on which is stored a computer program for controlling a motor vehicle remotely, the computer program, when executed by a computer, causing the computer to perform the following steps:
receiving motor vehicle setting signals, which represent a setting of a motor vehicle that intends to travel into a restricted geographic region;
receiving entry condition signals, which represent an entry condition that must be satisfied, so that a motor vehicle may travel into the region;
based upon the motor vehicle setting, checking whether the entry condition for the motor vehicle is satisfied;

generating remote control signals for controlling the motor vehicle remotely, based on a result of the check as to whether the entry condition is satisfied; and outputting the generated remote control signals, wherein when the result of the check indicates that the entry condition is not satisfied, an adapted motor vehicle setting is ascertained, and the setting of the motor vehicle is remotely adapted based on the adapted motor vehicle setting such that the motor vehicle may travel into the region, wherein the adapted motor vehicle setting includes at least one of: shifting a hybrid motor vehicle to pure electric drive, an internal combustion engine permitting only certain pollutant emissions, or a maximum speed or maximum acceleration specified for the motor vehicle, wherein surrounding-area signals are received, which represent a surrounding area of the motor vehicle including a current traffic situation, and the remote control signals are generated based on the surrounding area.

* * * * *